(12) United States Patent
Lin et al.

(10) Patent No.: US 11,555,271 B2
(45) Date of Patent: Jan. 17, 2023

(54) ARTIFICIAL LEATHER AND METHOD FOR PRODUCING THE SAME

(71) Applicant: SAN FANG CHEMICAL INDUSTRY CO., LTD., Kaohsiung (TW)

(72) Inventors: Chih-Yi Lin, Kaohsiung (TW); Kuo-Kuang Cheng, Kaohsiung (TW); Chien-Chia Huang, Kaohsiung (TW); Chia-Ho Lin, Kaohsiung (TW); Yen-Lun Tseng, Kaohsiung (TW); Chin-Wei Chen, Kaohsiung (TW); Ching-Lo Lin, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 0 days.

(21) Appl. No.: 17/098,558

(22) Filed: Nov. 16, 2020

(65) Prior Publication Data

US 2021/0262161 A1 Aug. 26, 2021

(30) Foreign Application Priority Data

Feb. 24, 2020 (TW) .................. 109105905
Apr. 13, 2020 (TW) .................. 109112400

(51) Int. Cl.
| | |
|---|---|
| D06N 3/14 | (2006.01) |
| B32B 27/08 | (2006.01) |
| B32B 27/12 | (2006.01) |
| B32B 27/40 | (2006.01) |
| B32B 7/12 | (2006.01) |
| B32B 27/26 | (2006.01) |
| B32B 9/04 | (2006.01) |

(52) U.S. Cl.
CPC .............. *D06N 3/145* (2013.01); *B32B 7/12* (2013.01); *B32B 9/047* (2013.01); *B32B 27/08* (2013.01);
(Continued)

(58) Field of Classification Search
CPC .. D06N 3/145; B32B 7/12; B32B 7/26; B32B 7/40; B32B 9/047; B32B 27/08;
(Continued)

(56) References Cited

U.S. PATENT DOCUMENTS 6,429,159 B1 * 8/2002 Watanabe ................ B32B 5/04
442/329
2006/0249244 A1 * 11/2006 Wang ..................... D06N 3/145
156/239

(Continued)

FOREIGN PATENT DOCUMENTS

| CN | 1265697 A | 9/2000 |
|---|---|---|
| CN | 1814907 A | 8/2006 |

(Continued)

*Primary Examiner* — Michael Zhang
(74) *Attorney, Agent, or Firm* — Elmore Patent Law Group, P.C.; Joseph C. Zucchero; Carolyn S. Elmore

(57) ABSTRACT

The present invention relates to an artificial leather and a method for producing the same. The artificial leather includes a substrate, a thermoplastic polyurethane fiber adhesive layer, a thermoplastic polyurethane fiber layer, a paste layer, and a surface layer. The paste layer has a thermosetting paste or a high solid-content paste, and the paste has a specific adhesive temperature. A bonding can be performed at low temperature in the method for producing the same, and the artificial leather made by the method for producing the same has excellent hand feeling and/or smoothness.

5 Claims, 2 Drawing Sheets

(52) U.S. Cl.
CPC .............. *B32B 27/12* (2013.01); *B32B 27/26* (2013.01); *B32B 27/40* (2013.01); *B32B 2255/26* (2013.01); *B32B 2255/28* (2013.01); *B32B 2260/023* (2013.01); *B32B 2375/00* (2013.01)

(58) Field of Classification Search
CPC ............ B32B 2255/26; B32B 2255/28; B32B 2260/023; B32B 2375/00
See application file for complete search history.

(56) References Cited

U.S. PATENT DOCUMENTS

| | | | |
|---|---|---|---|
| 2010/0159772 A1* | 6/2010 | Ashida | B32B 27/40 442/374 |
| 2011/0009510 A1* | 1/2011 | Gotoh | C09D 175/04 521/154 |
| 2020/0010985 A1 | 1/2020 | Park | |

FOREIGN PATENT DOCUMENTS

| | | | |
|---|---|---|---|
| CN | 103129059 A | 6/2013 | |
| CN | 106638015 A | 5/2017 | |
| CN | 108467470 A | 8/2018 | |
| TW | 200521289 A | 7/2005 | |
| TW | M528327 A | 9/2016 | |
| TW | 202007814 A | 2/2020 | |

* cited by examiner

ARTIFICIAL LEATHER AND METHOD FOR PRODUCING THE SAME

RELATED APPLICATION

This application claims priority to an earlier Taiwan Application Serial Number 109105905, filed on Feb. 24, 2020, and an earlier Taiwan Application Serial Number 109112400, filed on Apr. 13, 2020 which are incorporated herein by reference in their entirety.

BACKGROUND

Field of Invention

The present invention relates to an artificial leather and a method for producing the same, and more particularly relates to an artificial leather with a low adhering temperature and a method for producing the same.

Description of Related Art

In well-known methods for producing artificial leathers, organic solvents are used in a large amount, thereby causing environment pollutions. The aforementioned solvents generally are solvents with a high boiling point and low volatility, for example, dimethylformamide (DMF). In the methods for producing the artificial leathers, a bonding between a surface layer and a stacked material is performed at a high adhesive temperature, which results defects of energy consumptions. Additionally, during the bonding, a large amount of organic solvent easily causes a smoothness of the artificial leather to be lowered. Besides, a hand feeling of the artificial leather made by the methods for producing the artificial leathers is still poor. Therefore, there is a need to provide a new artificial leather and a method for producing the same to improve the aforementioned disadvantages.

SUMMARY

In view of the above problems, an aspect of the present invention is to provide an artificial leather. A paste layer of the artificial leather has a paste with a specific adhesive temperature. Therefore, a bonding can be performed at low temperature in the method for producing the artificial leather.

Another aspect of the present invention is to provide a method for producing the artificial leather to produce the aforementioned artificial leather.

According to an aspect of the present invention, the artificial leather is provided. The artificial leather comprises a substrate, a thermoplastic polyurethane fiber adhesive layer disposed on the substrate, a thermoplastic polyurethane fiber layer disposed on the thermoplastic polyurethane fiber adhesive layer, a paste layer disposed on the thermoplastic polyurethane fiber layer, and a surface layer disposed on the paste layer. The thermoplastic polyurethane fiber adhesive layer is located between the thermoplastic polyurethane fiber layer and the substrate, and the paste layer is located between the thermoplastic polyurethane fiber layer and the surface layer. Besides, the paste layer has a paste, and an adhesive temperature of the paste is 60° C. to 150° C., a solid content of the paste is 20% to 100%, and a viscosity of the paste is 5000 cps to 30000 cps.

According to an embodiment of the present invention, the paste layer comprises a thermosetting paste and/or a high solid-content paste, and the thermosetting paste comprises thermoplastic polyurethane, a chemical structure of thermoplastic polyurethane comprises a soft segments with a molecular weight of 1500 g/mol to 3000 g/mol.

According to another embodiment of the present invention, the surface layer comprises a water-based film and/or an oil-based film.

According to another aspect of the present invention, the method for producing the artificial leather is provided. In the method for producing the artificial leather, a substrate is first provided, and then a thermoplastic polyurethane fiber adhesive layer is meltblown on the substrate. Next, a thermoplastic polyurethane fiber layer is meltblown on the thermoplastic polyurethane fiber adhesive layer, and the thermoplastic polyurethane fiber adhesive layer is located between the thermoplastic polyurethane fiber layer and the substrate. Then, the substrate, the thermoplastic polyurethane fiber adhesive layer and the thermoplastic polyurethane fiber layer are thermally bonded to form a stacked material.

After the stacked material is formed, the paste layer is formed on the surface layer, and the paste layer comprises a paste, a solid content of the paste is 20% to 100%, and a viscosity of the paste is 5000 cps to 30000 cps. Then, the paste layer is heated to an adhesive temperature to adhere the paste layer to the thermoplastic polyurethane fiber layer of the stacked material, thereby producing the artificial leather. The adhesive temperature is 60° C. to 150° C., and the paste layer is located between the surface layer and the thermoplastic polyurethane fiber layer.

According to an embodiment of the present invention, the paste layer comprises a thermosetting paste and/or a high solid-content paste, and the thermosetting paste comprises thermoplastic polyurethane, a chemical structure of thermoplastic polyurethane comprises a soft segments with a molecular weight of 1500 g/mol to 3000 g/mol.

According to another embodiment of the present invention, the thermosetting paste comprises a crosslinking agent.

According to another embodiment of present invention, the surface layer comprises a water-based film and/or an oil-based film.

In an application of the artificial leather and the method for producing the same of the present invention, the paste layer has the paste with a specific adhesive temperature. The paste comprises the thermosetting paste and/or the high solid-content paste, the thermosetting paste comprises solvents with high volatility and a low boiling point, and the high solid-content paste comprises less organic solvents. Accordingly, in the method for producing the artificial leather, a adhesion between the paste layer and the thermoplastic polyurethane fiber layer can be performed at low adhesive temperature, and the artificial leather made by the same has excellent hand feeling and/or smoothness.

BRIEF DESCRIPTION OF THE DRAWINGS

Now please refer to description below and accompany with corresponding drawings to more fully understand embodiments of the present invention and advantages thereof. It has to be emphasized that all kinds of characteristics are not drawn in scale and only for illustrative purpose. The description regarding to the drawings as follows.

DETAILED DESCRIPTION

A manufacturing and usage of embodiments of the present invention are discussed in detail below. However, it could be understood that embodiments provide much applicable invention conception which can be implemented in various kinds specific contents. The specific embodiments discussed are only for illustration, but not be a limitation of scope of the present invention.

Figure 1:
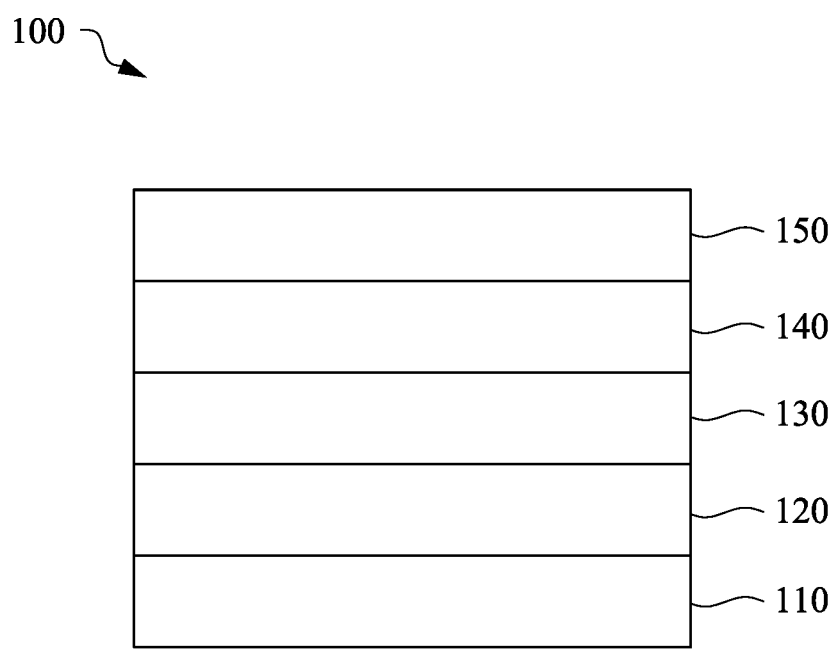
FIG. 1 illustrates a schematic diagram of a structure of an artificial leather according to an embodiment of the present invention.

Please refer to FIG. 1. FIG. 1 illustrates a schematic diagram of a structure of an artificial leather according to an embodiment of the present invention. The artificial leather 100 of the present invention comprises a substrate 110, a thermoplastic polyurethane fiber adhesive layer 120 disposed on the substrate 110, a thermoplastic polyurethane fiber layer 130 disposed on the thermoplastic polyurethane fiber adhesive layer 120, a paste layer 140 disposed on the thermoplastic polyurethane fiber layer 130, and a surface layer 150 disposed on the paste layer 140. The substrate 110 can be substrates well known to a person having ordinary sill in the art of the present invention, for example, nonwoven fabric, woven fabric, superfine fiber or the like.

The aforementioned thermoplastic polyurethane fiber adhesive layer 120 is used to adhere the substrate 110 to the thermoplastic polyurethane fiber layer 130. The thermoplastic polyurethane fiber adhesive layer 120 is formed on the substrate 110 by a meltblowing method. In some embodiments, a material of the thermoplastic polyurethane fiber adhesive layer 120 is thermoplastic polyurethane resin.

Similar to the thermoplastic polyurethane fiber adhesive layer 120, the aforementioned thermoplastic polyurethane fiber layer 130 is also formed on the thermoplastic polyurethane fiber adhesive layer 120 by a meltblowing method. In some embodiments, a material of the thermoplastic polyurethane fiber layer 130 is thermoplastic polyurethane resin.

The paste layer 140 is used to adhere the thermoplastic polyurethane fiber layer 130 to a surface layer 150. The paste layer 140 comprises a paste. The paste comprises a thermosetting paste and/or a high solid-content paste. The thermosetting paste comprises thermoplastic polyurethanes (TPU) and a crosslinking agent, and the crosslinking agent is not an organic tin based crosslinking agent. In some embodiments, the crosslinking agent can be aliphatic polyisocyanate or the like. Some properties (e.g. water-resistance, chemical-resistance and weather-resistance) of the thermosetting paste are enhanced by performing a crosslinking reaction to polyurethanes and the crosslinking agent. For example, the thermosetting paste can be two-liquid type adhesive.

Besides, the thermosetting paste comprises solvents with high volatility and a low boiling point, and the aforementioned solvents are not dimethylformamide or toluene. Because the solvents of the thermosetting paste have characterised of high volatility and a low boiling point, the adhesive temperature of the method for producing the artificial leather can be lowered.

The thermosetting paste comprises thermoplastic polyurethane. In some embodiments, the chemical structures of the aforementioned polyurethane comprises soft segments and hard segments. The soft segments are amorphous structures, and the molecular weight of the soft segments is 1500 to 3000 g/mole, and preferably is 2000 g/mole. Further, the hard segments have structures of asymmetry carbon chains. The soft segments structures equip the thermosetting paste with amorphousness and soft property at room temperature, therefore forming the paste layer 140 with softness and toughness after the thermosetting paste is cured, and the hand feeling of the artificial leather 100 is improved. Besides, the amorphous soft segments in the structures of the thermoplastic polyurethane of the thermosetting paste can lower the adhesive temperature of the high solid-content paste.

In some embodiments, the high solid-content paste comprises polyurethane, and a specific example thereof is polyamino carboxylic acid ethyl ester. There is no or less organic solvents in the high solid-content paste, and the organic solvents are not dimethylformamide, methyl ethyl ketone or toluene. Because the amount of the organic solvents of the high solid-content paste is less, it is unnecessary to heat the high solid-content paste to high temperature for performing the adhesion. Therefore, the adhesive temperature in the method for producing the artificial leather can be lowered.

In some embodiments, the solid content of the paste is 20 to 100%. The solid content of the thermosetting paste is 20 to 40%, and the solid content of the high solid content-paste is 90 to 100%. During the bonding of the thermoplastic polyurethane fiber layer 130 and the surface layer 150, because there is no or less organic solvents in the high solid-content paste, warpage problems resulted from organic solvents can be suppressed. Therefore, the high solid-content paste can improve smoothness of the artificial leather 100.

In some embodiments, a viscosity of the pates is 5000 to 30000 cps. The viscosity of the thermosetting paste is 5000 to 15000 cps, and the viscosity of the high solid-content paste is 5000 to 30000 cps. Generally, more the solid content is, higher the viscosity is, vice versa. Further, the solid content can influence the viscosity, and the viscosity can influence a thickness of the paste layer 140. When the paste with the viscosity of 5000 to 3000 cps is coated to form the paste layer 140, the thickness of the paste layer 140 is 0.16 mm to 0.30 mm. The paste layer 140 with the specific thickness is soft and is difficult to be fractured, thereby enhancing the hand feeling of the artificial leather 100.

The aforementioned surface layer 150 is used to provide the artificial leather 100 with patterns or textures. Besides, the surface layer 150 can comprises a water-based film and/or an oil-based film. In some embodiments, the materials of the water-based film can be aqueous polyurethane resin or the like, and the materials of the oil-based film can be oily polyurethane resin or the like. In some embodiments, both of the water-based film and the oil-based film can be applied for the thermosetting paste and the high solid-content paste. Preferably, the oil-based film is suited to the thermosetting paste, and the water-based film is suited to the high solid-content paste.

Figure 2:
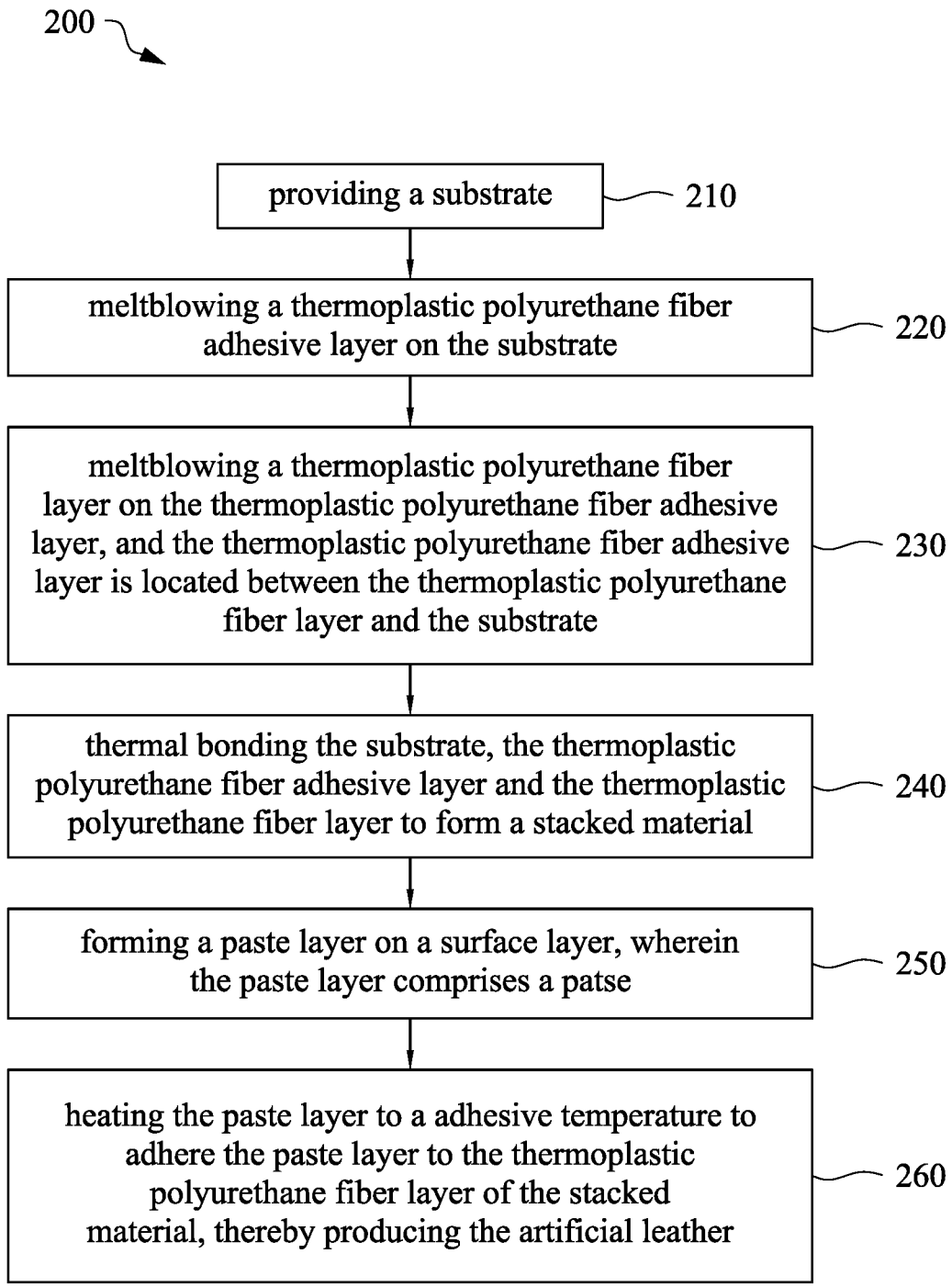
FIG. 2 illustrates a flow chart of a method for producing an artificial leather according to an embodiment of the present invention.

Please refer to FIG. 1 and FIG. 2 simultaneously. FIG. 2 is a flow chart of a method for producing an artificial leather according to an embodiment of the present invention. In the method 200 for producing the artificial leather 100 of the present invention, the substrate 110 is first provided, as shown in step 210.

After the step 210, the thermoplastic polyurethane fiber adhesive layer 120 is meltblown on the substrate 110, as shown in step 220. The step 220 is subjected melted thermoplastic polyurethane particles to form thermoplastic polyurethane fibers via a meltblowing method, and the fibers are stacked on the substrate 110 to from the thermoplastic polyurethane fiber adhesive layer 120.

In some embodiments, a drying step is selectively performed to the thermoplastic polyurethane particles between the step 210 and the step 220 to decrease a water content of the thermoplastic polyurethane particles, thereby facilitating meltblown process.

After the step 220, the thermoplastic polyurethane fiber layer 130 is meltblown on the thermoplastic polyurethane fiber adhesive layer 120, as shown in a step 230. The thermoplastic polyurethane fiber adhesive layer 120 is located between the thermoplastic polyurethane fiber layer 130 and the substrate 110. As mentioned above, in some embodiments, the thermoplastic polyurethane fiber layer 130 is formed from the molten thermoplastic polyurethane particles by the meltblowing method.

Because the thermoplastic polyurethane fiber adhesive layer 120 is used for bonding, such that the thermoplastic polyurethane particles of the thermoplastic polyurethane fiber adhesive layer 120 have generally low melting points to provide an excellent bonding. However, the thermoplastic polyurethane fiber layer 130 provides the artificial leather 100 with the hand feeling and the peel strength. Therefore, the melting points of the thermoplastic polyurethane particles of the thermoplastic polyurethane fiber layer 130 are higher than those of the thermoplastic polyurethane particles of the thermoplastic polyurethane fiber adhesive layer 120.

In some embodiments, a drying step is performed to the thermoplastic polyurethane particles between the step 220 and the step 230. After the aforementioned step 230, the substrate 110, the thermoplastic polyurethane fiber adhesive layer 120 and the thermoplastic polyurethane fiber layer 130 are thermally bonded to form a stacked material, as shown in a step 240. In some embodiments, the step 240 is performed by a stork crawler machine or plan heating holation to bond.

After the step 240, the paste layer 140 with the paste is formed on the surface layer 150, as shown in a step 250. The paste layer 140 and the surface layer 150 are described as above rather than mentioning them in details.

After the step 250, the paste layer 140 is heated to an adhesive temperature to adhere the paste layer 140 to the thermoplastic polyurethane fiber layer 130 of the stacked material, thereby producing the artificial leather 100, as shown in a step 260. The adhesive temperature is 60 to 150° C., and the paste layer 140 is located between the surface layer 150 and the thermoplastic polyurethane fiber layer 130. In some embodiments, the adhesive temperature can be preferably 70 to 140° C. In other embodiments, the adhesive temperature can be preferably 65 to 80° C.

As shown in FIG. 2, although the step 250 is proceeded after the step 240, but it is not limited to the present invention. In some embodiments, the step 250 is proceeded after the step 240, e.g. after the steps 210 to 240 are proceeded, the step 250 is proceeded. However, in other embodiments, the step 250 and the steps 210 to 240 are simultaneously proceeded to obtained the stacked material and the surface layer 150 with the paste layer 140. Then, a step 260 is proceeded.

The method 200 for producing the artificial leather further can comprise a post-processing and shaping operation. In some embodiments, a temperature of the post-processing and shaping operation is 90 to 110° C. Preferably, the temperature of the post-processing and shaping operation is 100° C.

For example, the post-processing and shaping operation can be proceeded by high-frequency waves, male-female molds or a vacuum suction. In the shaping with the high-frequency waves, a voltage is 60 to 90 V, an electric current is 3 to 4 A, a temperature of the mold is 50 to 100° C., and a molten connecting time is 5 to 10 s. In the shaping with male-female molds, a temperature of a upper mold is 90 to 110° C., a temperature of a lower mold is 90 to 110° C., a period for heat pressing is 1 to 3 mins, and a pressure is 25 to 100 kg/cm². In the shaping with the vacuum suction, a heating temperature is 90 to 120° C., a heating time is 1 to 2 mins, a suction time is 1 to 2 mins, and a suction pressure is −760 mm Hg.

The following embodiments are used to illustrated the applications of the present invention, but they are not used to limit the present invention, it could be made various changes or modifications for a person having ordinary sill in the art without apart from the inspire and scope of the present invention.

Production of Artificial Leather

Embodiment 1

Polyethylene terephthalate (PET) nonwoven fabric (i.e. 100% recycled PET) completely made from recycled materials is used as a substrate. Next, after TPU particles are dried at 60° C. for 4 hours, a water content thereof is decreased to not more than 100 ppm. Then, the dried TPU particles are meltblown to stack on the aforementioned nonwoven fabric in fabric shaped mode, thereby forming a thermoplastic polyurethane fiber adhesive layer. Next, after TPU particles used to form a thermoplastic polyurethane fiber layer are dried at 80° C. for 4 hours, a water content thereof is decreased to not more than 100 ppm. Then, the aforementioned TPU particles are meltblown to stack on the aforementioned thermoplastic polyurethane fiber adhesive layer, thereby forming a thermoplastic polyurethane fiber layer. Next, the thermoplastic polyurethane fiber adhesive layer is thermally adhered to the thermoplastic polyurethane fiber layer by a stork crawler machine, thereby forming a stacked material.

After 100 g of oily polyurethane resin and 1 to 10 g of pearlescence are mixed, the mixed one is coated on a release paper, and a thickness of the coated film is 0.13 to 0.18 mm. Next, after dried at 100° C., the aforementioned coated film is peeled off the release paper to form an oil-based film.

Continuously, a thermosetting paste produced by San Fang Chemical Industry CO. LTD. is used. The thermosetting paste comprises polyurethane comprising soft segments with a molecular weight of 1500 to 2500 g/mole and hard segments with asymmetry carbon chains, and a crosslinking agent is aliphatic polyisocyanate. Before the thermosetting paste is used, the polyisocyanate and the crosslinking agent are mixed. The thermosetting paste is coated on the aforementioned oil-based film, and a coated thickness is 0.16 to 0.30 mm. Next, a predrying is proceeded at 70° C. to from a paste layer on the oil-based film. Then, the aforementioned paste layer is bonded to the thermoplastic polyurethane fiber layer of the aforementioned stacked material, thereby producing an artificial leather of Embodiment 1, and specific conditions of Embodiment 1 are shown in Table 1.

Embodiments 2 to 4

Embodiments 2 to 4 are practiced with the same method as in Embodiment 1 by using various equipments and conditions for producing the stacked materials, various types of the surface layer and the paste, and various adhesive conditions. In Embodiments 2 and 4, the high solid-content paste and a polyurethane surface layer produced by San Fang Chemical Industry CO. LTD. are used, and the high solid-content paste is polyurethane adhesive with a high solid content. In Embodiments 3, the polyurethane thermosetting paste comprising soft segments with a molecular weight of 1500 to 2500 g/mole and hard segments with asymmetry carbon chains and an oil-based film are used. Specific conditions of Embodiments 2 to 4 are shown in Table 1.

Comparative Embodiment 1

Comparative Embodiment 1 is an artificial leather produced by a well-known wetting process. In Comparative Embodiment 1, a polyethylene terephthalate/nylon substrate, an oil-based polyurethane fiber adhesive layer, an oil-based polyurethane fiber layer, an oil-based polyurethane paste layer containing DMF, an aliphatic polyisocyanate crosslinking agent and an oil-based polyurethane surface layer are used. A thickness of the paste layer is 0.16 to 0.3 mm, and an adhesive temperature is 150° C.

TABLE 1

| Producing condition | | | Embodiment 1 | Embodiment 2 | Embodiment 3 | Embodiment 4 |
|---|---|---|---|---|---|---|
| | | Substrate | 100% recycled PET | 100 % recycled PET | 100 % recycled PET | 100 % recycled PET |
| Thermoplastic polyurethane fiber adhesive layer | TPU particles | Hardness (A) | 70~90 | 70~90 | 70~90 | 70~90 |
| | | Melting point f C) | 100~150 | 100~150 | 100~150 | 100~150 |
| | | Water content (ppm) | Not more than 100 | Not more than 100 | Not more than 100 | Not more than 100 |
| | | Head temperature (° C.) | 210 | 230 | 230 | 230 |
| | | DIE temperature (° C.) | 210 | 230 | 230 | 230 |
| | | Hot air temperature of spinneret (° C.) | 220 | 240 | 240 | 240 |
| | | Spinning pressure (MPa) | 4.5~10 | 4.5~10 | 4.5~10 | 4.5~10 |
| | | Average fineness of meltblown fibers (μm) | 10 | 10 | 10 | 10 |
| | | Stacked thickness (mm) | 0.15 | 0.15 | 0.15 | 0.15 |
| Thermoplastic polyurethane fiber layer | TPU particles | Hardness (A) | 70~90 | 70~90 | 70~90 | 70~90 |
| | | Melting point (° C.) | 150~180 | 150~180 | 150~180 | 150~180 |
| | | Water content (ppm) | Not more than 100 | Not more than 100 | Not more than 100 | Not more than 100 |
| | | Head temperature (° C.) | 240 | 250 | 250 | 250 |
| | | DIE temperature ( C) | 240 | 250 | 250 | 250 |
| | | Hot air temperature of spinneret (° C.) | 250 | 260 | 260 | 260 |
| | | Spinning pressure (MPa) | 4.5~10 | 4.5~10 | 4.5~10 | 4.5~10 |
| | | Average fineness of meltblown fibers (μm) | 10 | 10 | 10 | 10 |
| | | Stacked thickness (mm) | 0.30 | 0.30 | 0.30 | 0.30 |
| Stacked material | stork crawler machine | Temperature of preheating zone (° C.) | 120 | Unused | 130 | Unused |
| | | Temperature of compression zone (° C.) | 130 | | 140 | |
| | | Extrusion pressure (kg/cm$^2$) | 4 | | 4 | |
| | | Production rate (m/min) | 9 | | 9 | |
| | Plan heating holation | Temperature of preheating wheel (° C.) | Unused | 110, 140 | Unused | 110, 140 |
| | | Temperature of compressing wheel (° C.) | | 50 | | 50 |
| | | Extrusion gag (mm) | | 0.75 | | 0.75 |
| | | Production rste (m/min) | | 9 | | 9 |
| | Surface layer | | Oil-based film | Water-based film | Oil-based film | Water-based film |
| Paste layer | Paste | Type | Thermosetting paste | High solid-content paste | Thermosetting paste | High solid-content paste |
| | | Solid content (%) | 20~40 | 90~100 | 20~40 | 90~100 |
| | | Viscosity (cps) | 5000~15000 | 5000~30000 | 5000~15000 | 5000~30000 |
| | | Crosslinking agent | Aliphatic polyisocyanste | Unused | Aliphatic polyisocyanste | Unused |
| Arfificial leather | | Adhesive temperature (° C.) | 65~80 | 70~140 | 65~80 | 70~140 |
| | | Air flow (rpm) | 300~1800 | 300~1800 | 300~1800 | 300~1800 |
| | | speed (m/min) | 5~10 | 5~8 | 5~10 | 5~8 |
| | | Adhesive pressure(kg/m$^2$) | 3~6 | 3~6 | 3~6 | 3~6 |

Evaluation Methods

1. Flexibility at Room Temperature

Flexibility at room temperature of the present invention is evaluated based on the standard method (SATRA PM 55), and results thereof are shown in Table 2.

2. Peel Strength

Peel strength of the present invention is evaluated based on the Standard Method (NIKE G44), and results thereof are shown in Table 2.

3. Hardness

Hardness of the present invention is evaluated in an environment with temperature of 22±2° C. and humidity of 50±10%, and 25 mm testing ring is used to measure hardnesses on three different regions of the artificial leathers of the aforementioned embodiments and comparative embodiment, respectively. Every region is measured once, and an average value is calculated from three data, and results thereof are shown in Table 2.

4. Edge Warping Evaluation

Edge warping evaluation of the present invention is evaluated with well-known method. Warping heights at the edge of the artificial leathers are measured, and an evaluation was made according to the following criterion. The results thereof are shown in Table 2.

◯: warping height at the edge of the artificial leather is less than 1 cm.

X: warping height at the edge of the artificial leather is equal to or more than 1 cm.

TABLE 2

| Evaluation item | Embodiment 1 | Embodiment 2 | Embodiment 3 | Embodiment 4 | Comparative Embodiment 1 |
|---|---|---|---|---|---|
| Flexibility at room temperature (times) | Not less than 100,000 | Not less than 100,000 | Not less than 100,000 | Not less than 100,000 | Not less than 100,000 |
| Peel strength (kg/cm) | Not less than 3 | Not less than 3 | Not less than 1 | Not less than 1 | Not less than 3 |
| Hardness (mm) | 3.0~3.5 | 2.6~3.0 | 5.0~5.5 | 4.0~4.5 | 2.0~2.5 |
| Edge warping | — | ○ | — | ○ | X |

Please refer to Table 2, the results obtained by evaluation methods above according to every embodiment and comparative embodiment of the artificial leathers of the present invention. In comparison with the artificial leather produced by a wetting process of Comparative Embodiment 1, the artificial leathers produced by Embodiments 1 to 4 have better hardness, thereby having better hand feeling. Additionally, in comparison with the artificial leather produced by the wetting process of Comparative Embodiment 1, the artificial leathers produced by Embodiments 2 and 4 have smaller warping height at the edge. Therefore, the artificial leathers have better smoothness, and are facilitate for subsequent automatic machine cutting.

On the other hand, for processes of the artificial leather, a higher adhesive temperature (150° C.) is used in the wetting process of Comparative Embodiment 1, and a lower adhesive temperature (65 to 140° C.) is used in Embodiments 1 to 4. Therefore, an energy consumption of processing process is decreased.

In summary, the artificial leather of the present invention comprises the substrate, the thermoplastic polyurethane fiber adhesive layer, the thermoplastic polyurethane fiber layer, the paste layer and the surface layer. The paste layer has a paste, and the paste has a specific adhesive temperature. The paste comprises the thermosetting paste with high volatility and low boiling-point solvents and/or the high solid-content paste with less organic solvents. Therefore, a bonding of the method for producing the artificial leather of the present invention can be performed at low adhesive temperature, and the artificial leather made by the method has excellent hand feeling and/or smoothness.

What is claimed is:

1. An artificial leather, comprising:
   a substrate;
   a thermoplastic polyurethane fiber adhesive layer, disposed on the substrate;
   a thermoplastic polyurethane fiber layer, disposed on the thermoplastic polyurethane fiber adhesive layer, and the thermoplastic polyurethane fiber adhesive layer is located between the thermoplastic polyurethane fiber layer and the substrate;
   a paste layer, disposed on the thermoplastic polyurethane fiber layer, wherein the paste layer comprises a thermosetting paste, a solid content of the thermosetting paste is 20 to 40%, the thermosetting paste comprises thermoplastic polyurethane, a chemical structure of the thermoplastic polyurethane comprises a soft segment with a molecular weight of 1500 g/mol, an adhesive temperature of the thermosetting paste is 65° C. to 80° C., and a viscosity of the thermosetting paste is 5000 cps to 30000 cps; and
   a surface layer, disposed on the paste layer, and the paste layer is located between the thermoplastic polyurethane fiber layer and the surface layer.

2. The artificial leather of claim 1, wherein the surface layer comprises a water-based film and/or an oil-based film.

3. A method for producing an artificial leather, comprising:
   providing a substrate;
   meltblowing a thermoplastic polyurethane fiber adhesive layer on the substrate;
   meltblowing a thermoplastic polyurethane fiber layer on the thermoplastic polyurethane fiber adhesive layer, and the thermoplastic polyurethane fiber adhesive layer is located between the thermoplastic polyurethane fiber layer and the substrate;
   thermal bonding the substrate, the thermoplastic polyurethane fiber adhesive layer and the thermoplastic polyurethane fiber layer to form a stacked material;
   forming a paste layer on a surface layer, wherein the paste layer comprises a thermosetting paste, a solid content of the thermosetting paste is 20 to 40%, the thermosetting paste comprises thermoplastic polyurethane, a chemical structure of the thermoplastic polyurethane comprises a soft segment with a molecular weight of 1500 g/mol and a viscosity of the thermosetting paste is 5000 cps to 30000 cps; and
   heating the paste layer to an adhesive temperature to adhere the paste layer to the thermoplastic polyurethane fiber layer of the stacked material, thereby producing the artificial leather, wherein the adhesive temperature is 65° C. to 80° C., and the paste layer is located between the surface layer and the thermoplastic polyurethane fiber layer.

4. The method for producing the artificial leather of claim 3, wherein the thermosetting paste comprises a crosslinking agent.

5. The method for producing the artificial leather of claim 3, wherein the surface layer comprises a water-based film and/or an oil-based film.

* * * * *